United States Patent
Chen et al.

(10) Patent No.: US 9,361,837 B2
(45) Date of Patent: Jun. 7, 2016

(54) METHOD AND APPARATUS FOR DYNAMICALLY ADJUSTING VIEWING ANGLE OF SCREEN

(75) Inventors: Hsi-Kun Chen, Taoyuan County (TW); Hui-Wen Wang, Taoyuan County (TW); Chao-Yi Chen, Taoyuan County (TW); Chi-Nien Chen, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 1318 days.

(21) Appl. No.: 12/334,551

(22) Filed: Dec. 15, 2008

(65) Prior Publication Data

US 2009/0167737 A1    Jul. 2, 2009

(30) Foreign Application Priority Data

Dec. 31, 2007  (TW) ............................... 96151574 A

(51) Int. Cl.
*G09G 3/36* (2006.01)
*G06F 3/01* (2006.01)
*G06F 21/83* (2013.01)
*H04N 5/64* (2006.01)

(52) U.S. Cl.
CPC *G09G 3/36* (2013.01); *G06F 21/83* (2013.01); *H04N 5/64* (2013.01); *G06F 3/01* (2013.01); *G09G 2320/028* (2013.01); *G09G 2320/068* (2013.01)

(58) Field of Classification Search
CPC .............. G09G 3/36; G09G 2320/028; G09G 2320/068
USPC ................................... 345/87–104, 204–699
See application file for complete search history.

(56) References Cited

U.S. PATENT DOCUMENTS

| | | | |
|---|---|---|---|
| 6,205,554 B1* | 3/2001 | Sasaki et al. | 726/19 |
| 6,917,368 B2* | 7/2005 | Credelle et al. | 345/589 |
| 6,954,193 B1* | 10/2005 | Andrade et al. | 345/90 |
| 2005/0078086 A1 | 4/2005 | Grams et al. | |
| 2008/0036714 A1* | 2/2008 | Imai et al. | 345/87 |

FOREIGN PATENT DOCUMENTS

| | | |
|---|---|---|
| CN | 1758669 | 4/2006 |
| CN | 1940685 | 4/2007 |

(Continued)

OTHER PUBLICATIONS

"Second Office Action of China Counterpart Application", issued on Sep. 8, 2011, p. 1-p. 5.
"First Office Action of China Counterpart Application," issued on Sep. 26, 2010, p. 1-p. 4.
"First Office Action of China counterpart application" issued on Jul. 3, 2012, p. 1-p. 7.
"Office Action of Taiwan Counterpart Application", issued on Apr. 29, 2013, p. 1-p. 10.
"Third Office Action of China counterpart application" issued on Oct. 12, 2013, p. 1-p. 7.
"Office Action of Taiwan Counterpart Application", issued on Nov. 29, 2013, p. 1-p. 9.

*Primary Examiner* — David Tung
(74) *Attorney, Agent, or Firm* — Jianq Chyun IP Office

(57) ABSTRACT

A method and an apparatus for dynamically adjusting a viewing angle of a screen are provided. The method is suitable for dynamically adjusting a viewing range of a screen of a handheld electronic device, wherein the viewing angle of the screen is adjustable. The method is as follows. First, a shifting value of a target deviating from the viewing range of the screen is detected by a sensor. Next, the viewing range of the screen is dynamically adjusted according to the shifting value, so as to cover the target within the viewing range of the screen. Accordingly, the snooping for the content of a frame displayed on the screen by others can be prevented and a user can view the frame displayed on the screen more conveniently.

6 Claims, 6 Drawing Sheets

(56) References Cited

FOREIGN PATENT DOCUMENTS

| CN | 101055358 A | 10/2007 |
| CN | 101470446 | 7/2009 |
| EP | 1124175 | 8/2001 |
| FI | EP1124175 | * 8/2001 ............ G06F 3/033 |
| JP | 2001-236023 | 8/2001 |
| JP | 2006-284639 | 10/2006 |
| WO | 2006025340 | 3/2006 |

* cited by examiner

METHOD AND APPARATUS FOR DYNAMICALLY ADJUSTING VIEWING ANGLE OF SCREEN

CROSS-REFERENCE TO RELATED APPLICATION

This application claims the priority benefit of Taiwan application serial no. 96151574, filed on Dec. 31, 2007. The entirety of the above-mentioned patent application is hereby incorporated by reference herein and made a part of specification.

BACKGROUND OF THE INVENTION

1. Field of the Invention

The present invention relates to a method for adjusting a viewing angle of a screen. More particularly, the present invention relates to a method for dynamically adjusting a viewing angle of a screen according to a relative position between an apparatus and a user.

2. Description of Related Art

With blooming development of technology, various electronic products are provided. Wherein, a handheld electronic device such as a cell phone, a personal digital assistant (PDA) and an intelligent cell phone allows a user to implement functions such as writing documents, receiving e-mails, surfing on internet or real-time communication etc. via a built-in windows operation system thereof. Namely, such handheld electronic device may not only make phone calls, but may also provide diversified functions as a small personal computer does. With development of wireless network techniques, utilization of such functions is no longer limited by time and space, and therefore the handheld electronic device has become one of an indispensable tool for those modern human beings demanding high efficiencies in daily life.

As the handheld electronic devices are widely used, how to ensure a security of data stored therein gradually draws attention. Data stored in the handheld electronic device are generally personal information closely related to the user, such as phone numbers, commercial data or other personal information etc., which generally have a considerable privacy. If such kind of handheld electronic device is used for browsing data in public, since a viewing angle of a screen thereon is not limited, a snooping of private data by others may occur time to time.

To prevent leakage of data displayed on the screen, a present solution is to shrink the viewing angle of the screen, so as to shrink a viewing range of the screen for preventing the snooping. Taking present products in the market as an example, a snooping-proof protection film is generally attached to the screen of the product. By a polarizing effect of the protection film, lights emitted from certain angles are shielded, and only a fixed viewing angle is provided. Another kind of product applies a liquid crystal screen having an adjustable viewing angle, in which based on the transformation of liquid crystal material within the screen, lights emitted from a backlight source of the screen to certain angles that are shielded. By such means, shrinking of viewing angle may also be achieved.

However, though the methods for shrinking viewing angle may protect data displayed on the screen from snooping, the fixed viewing angle may also limit the flexibility for the user to view the screen. In detail, since the viewing angle of the screen is fixed, the user may only watch the screen in a fixed angle. However, during utilization of the handheld electronic device, due to different holding manner, viewing pose and other factors such as background light, viewing angle thereof needs to be adjusted constantly, and therefore it is needed to move the handheld electronic device manually for adjusting the position and the angle of the screen, so as to guide the viewing angle facing to the user for the user to see the data displayed on the screen. Therefore, the conventional methods are still not convenient.

SUMMARY OF THE INVENTION

Accordingly, the present invention is directed to a method for dynamically adjusting a viewing angle of a screen, by which the viewing angle of the screen may be dynamically adjusted according to a relative position between a user and the screen, so as to guide the viewing angle facing to the user, and increase the convenience for operating the apparatus.

The present invention is directed to an apparatus for dynamically adjusting a viewing angle of a screen, in which a sensor is used for detecting a relative position between a handheld electronic apparatus and a user, so as to adjust a position and a viewing range of the screen for preventing the data displayed on the screen from snooping.

To achieve the aforementioned and other advantages, the present invention provides a method for dynamically adjusting a viewing angle of a screen, which is suitable for dynamically adjusting a viewing range of a screen of a handheld electronic apparatus, wherein the viewing angle of the screen is adjustable. The method is as follows. First, a shifting value of a target deviating from the viewing range of the screen is detected by a sensor. Next, the viewing range of the screen is dynamically adjusted according to the shifting value, so as to cover the target within the viewing range of the screen.

In an embodiment of the present invention, the step of dynamically adjusting the viewing range of the screen according to the shifting value, so as to cover the target within the viewing range of the screen includes dynamically transforming liquid crystal material of the screen according to the shifting value for shielding the light emitted from a backlight source of the screen to an area out of the adjusted viewing range.

In an embodiment of the present invention, the step of detecting the shifting value of the target deviating from the viewing range of the screen via the sensor includes first detecting a tilting angle of the screen during normal utilization via a G sensor for determining a reference plane, and then detecting a shifting value of a present plane of the screen deviating from the reference plane via the G sensor, so as to determine the shifting value of the target deviating from the viewing range of the screen.

In an embodiment of the present invention, the step of detecting the shifting value of the target deviating from the viewing range of the screen via the sensor includes capturing an image displayed on the screen while the target views the screen via an image sensor, and then determining the shifting value of the target deviating from the viewing range of the screen according to a position of the target in the image.

In an embodiment of the present invention, after the step of detecting the shifting value of the target deviating from the viewing range of the screen, the method further includes first adjusting a position and an angle of the screen via a screen position adjuster of the handheld electronic apparatus according to the shifting value, so as to guide the screen facing to the object, and then detecting a shifting value of the target deviating from the viewing range of the adjusted screen again, so as to dynamically adjust the viewing range of the screen according to the shifting value for covering the target within the viewing range of the screen.

In an embodiment of the present invention, the target includes one of a face area and an eye area of a user.

In an embodiment of the present invention, the viewing range is included within a viewing angle that a user may view a frame displayed on the screen.

In an embodiment of the present invention, the handheld electronic apparatus includes one of a cell phone, a personal digital assistant (PDA) and a notebook computer.

The present invention provides a method for dynamically adjusting a viewing angle of a screen, which is suitable for dynamically adjusting a viewing angle of a screen of a handheld electronic apparatus, wherein the viewing angle of the screen is adjustable. The method is as follows. First, a shifting value of a present plane of the screen deviating from a reference plane of the screen during normal utilization is detected by a G sensor. Next, the viewing range of the screen is dynamically adjusted according to the shifting value, so as to cover a target within the viewing range of the screen.

In an embodiment of the present invention, before the step of detecting the shifting value of the present plane of the screen deviating from the reference plane of the screen during normal utilization by the G sensor, the method further includes detecting a tilting angle of the screen during normal utilization by the G sensor when the handheld electronic apparatus is activated, so as to determine the reference plane.

The present invention provides a method for dynamically adjusting a viewing angle of a screen, which is suitable for dynamically adjusting a viewing angle of a screen of a handheld electronic apparatus, wherein the viewing angle of the screen is adjustable. The method is as follows. First, an image displayed on the screen is captured by an image sensor while a target views the screen. Next, a shifting value of the target deviating from the viewing range of the screen is determined according to a position of the target in the image. Finally, the viewing range of the screen is dynamically adjusted according to the shifting value, so as to cover the target within the viewing range of the screen.

The present invention provides an apparatus for dynamically adjusting a viewing angle of a screen. The apparatus includes a screen having an adjustable viewing angle, a sensor and a control unit, wherein the sensor is used for detecting a shifting value of a region where a target is located deviating from the viewing range of the screen; and the control unit is used for dynamically adjusting the viewing range of the screen, so as to cover the region where the target is located within the viewing range of the screen.

In an embodiment of the present invention, the sensor includes a G sensor and is used for detecting a shifting value of a present plane of the screen deviating from a reference plane of the screen during normal utilization.

In an embodiment of the present invention, the sensor includes an image sensor and is used for capturing an image displayed on the screen when a target watches the screen, so as to determine a shifting value of the target deviating from the viewing range of the screen according to a position of the target in the image.

In an embodiment of the present invention, the material of the screen includes liquid crystal material, which may be transformed according to the shifting value, so as to shield the light emitted from a backlight source of the screen to an area out of the adjusted viewing range.

In an embodiment of the present invention, the apparatus for dynamically adjusting the viewing angle of the screen further includes a screen position adjuster for adjusting a position and an angle of the screen according to the shifting value, so as to guide the screen facing to the target, wherein the target includes one of a face area and an eye area of a user.

In an embodiment of the present invention, the apparatus for dynamically adjusting the viewing angle of the screen includes one of a cell phone, a PDA and a notebook computer.

In the present invention, a handheld electronic apparatus applies a screen having an adjustable viewing angle, in which a G sensor may be used for detecting a tilting angle of the handheld electronic apparatus, or an image sensor may be used for detecting a position variation of a user, so as to adjust a viewing range of the screen. Accordingly, the snooping of data displayed on the screen is prevented and the convenience for operating the apparatus is increased.

In order to make the aforementioned and other objects, features and advantages of the present invention comprehensible, a preferred embodiment accompanied with figures is described in detail below.

DESCRIPTION OF EMBODIMENTS

Generally, an optimal viewing angle for a user to view a screen is obtained when the head of the user is aligned with centre of the screen, and therefore in a conventional method for shrinking the viewing angle of the screen, a viewing range of the screen is limited within a certain front angle of the screen. However, the viewing angle of a handheld electronic apparatus may be constantly varied due to different holding manner or watching pose of a user, or due to factors such as variation of background light. Therefore, a tilting angle of the handheld electronic apparatus or a movement of the user should be acquired for appropriately adjusting the viewing angle of the screen, such that the user may still view the frame displayed on the screen under various circumstances. Accordingly, the present invention provides a method and an apparatus for dynamically adjusting the viewing angle of the screen based on the above concept. To fully convey the spirit of the present invention to those skilled in the art, embodiments of the present inventions are described in detail below.

Figure 1:
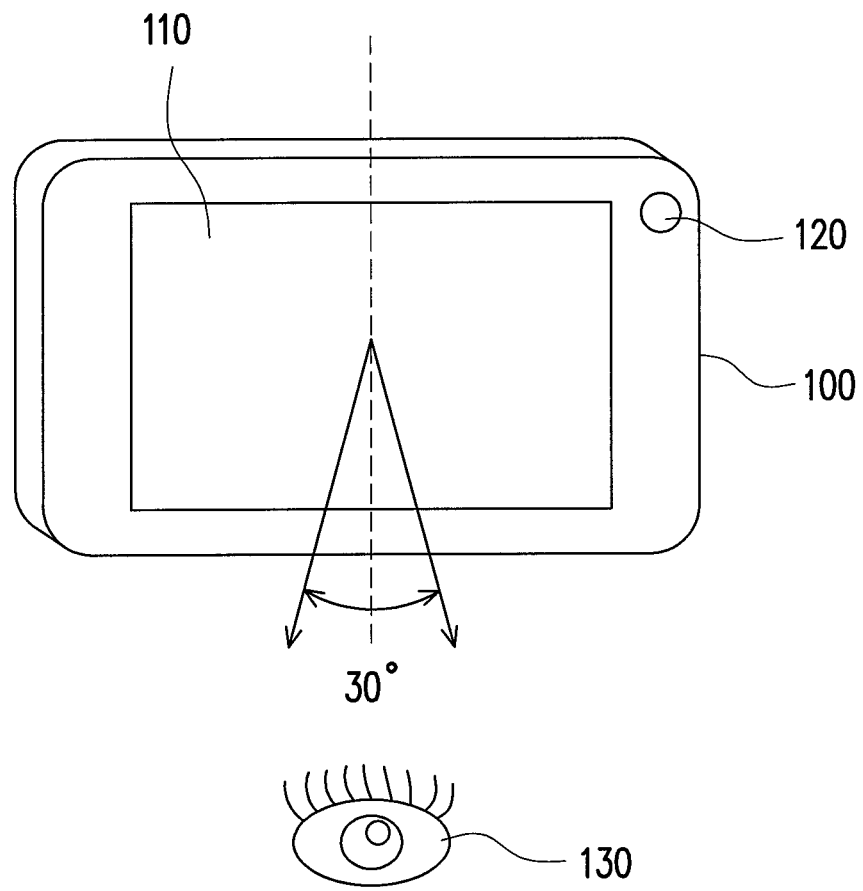
FIG. 1 is a block diagram illustrating an apparatus for dynamically adjusting a viewing angle of a screen according to an embodiment of the present invention.

FIG. 1 is a block diagram illustrating an apparatus for dynamically adjusting a viewing angle of a screen according to an embodiment of the present invention. Referring to FIG. 1, an adjusting apparatus 100 of the present embodiment includes a screen 110, a sensor 120 and a control unit (not shown). The sensor 120 detects a tilting angle of the adjusting apparatus 100 or a movement of the user, and provides such information to the control unit for adjusting the viewing range of the screen 110. The adjusting apparatus 100 may be a handheld electronic apparatus such as a cell phone, a personal digital assistant (PDA) or a notebook computer. The screen 110 may be a screen having an adjustable viewing angle. Functions of each of the elements within the adjusting apparatus 100 are respectively described below.

The viewing range of the screen 100 is adjustable, and is covered by a viewing angle where the user may view a frame displayed on the screen. The screen 100 includes a layer of liquid crystal material (not shown), and by transformation of the liquid crystal material, the screen 110 may shield the light emitted from a backlight source (not shown) thereof to an area out of the adjusted viewing range, so as to prevent the screen 110 from being snooped by others.

The sensor 120 is used for detecting a shifting value of a target deviating from the viewing range of the screen 110. In detail, the sensor 120 may be a G sensor which may detect a shifting value of a present plane of the screen 110 deviating from a reference plane of the screen 110 during normal utilization. On the other hand, the sensor 120 may also be an image sensor which may capture an image displayed on the screen 110 while the target views the screen 110. The control unit may determine the shifting value of the target deviating from the viewing range of the screen 110 according to a position of the target in the image. Wherein, the target may be a face area or an eye area of the user, which is not limited by the present invention.

It should be noted that after the sensor 120 detects the shifting value, the adjusting apparatus 100 then dynamically adjusts the viewing range of the screen 110 for covering the target within the viewing range of the screen 110. Another embodiment is provided below, in which detailed steps how the adjusting apparatus 100 dynamically adjusts the viewing angle of the screen by is described.

Figure 2:
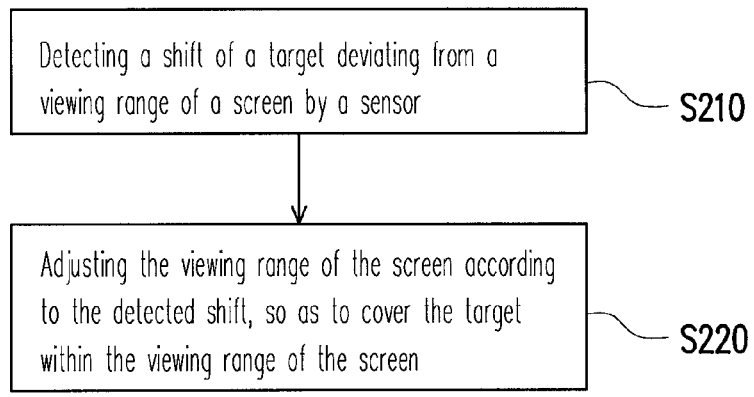
FIG. 2 is a flowchart illustrating a method for dynamically adjusting a viewing angle of a screen according to an embodiment of the present invention.

FIG. 2 is a flowchart illustrating a method for dynamically adjusting a viewing angle of a screen according to an embodiment of the present invention. Referring to FIG. 2, the method of the present embodiment is suitable for adjusting a viewing range of a screen of a handheld electronic apparatus. Wherein, the handheld electronic apparatus may be a cell phone, a PDA or a notebook computer, and viewing angle of the screen is adjustable. Detailed steps of the method are as follows.

First, a shifting value of a target deviating from the viewing range of the screen is detected by a sensor of the handheld electronic apparatus (step S210). Wherein, by analysing reasons that cause a viewing angle of a user (target) deviating from the viewing range of the screen, it can be concluded into two main situations. One situation is that the user maintains stable while the handheld electronic apparatus moves, during which a position or an angle of the handheld electronic apparatus is deviated from the viewing angle of the user due to different holding manner or placing position of the handheld electronic apparatus. Another situation is that the handheld electronic apparatus maintains stable and the user moves, during which the viewing angle of the user is deviated from the viewing range of the screen due to variation of viewing pose or viewing direction of the user.

Both of the two above situations may cause a change of relative positions between the handheld electronic apparatus and the user. Accordingly, as to the two situations, in the present embodiment, the sensor equipped on the handheld electronic apparatus detects the shifting value of the target deviating from the viewing range of the screen, and the viewing range of the screen is then adjusted according to the shifting value. Wherein, the viewing range represents a range within a viewing angle where a user may view a frame displayed on the screen, and the target represents a part of the user that may actually watch a location of the screen such as a face area or an eye area of the user, which is not limited by the present invention.

After the shifting value of the target deviating from the viewing range of the screen is obtained, according to the feature that the viewing angle of the screen is adjustable, the viewing range of the screen then may be adjusted according to the detected shifting value, so as to cover the target within the viewing range of the screen (step S220). To be specific, based on transformation of the liquid crystal material of the screen, the screen may shield the light emitted from a backlight source thereof, so as to limit the viewing range of the screen to be within a certain specific angle. In the present embodiment, after the shifting value is obtained, a direction of the viewing angle of the screen to be adjusted is then determined according to the shifting value, and then the liquid crystal material of the screen is dynamically transformed, so as to shield the light emitted from the backlight source of the screen to an area out of the adjusted viewing range, and therefore only the light within the viewing range is remained. Accordingly, the viewing range of the screen is dynamically adjusted, and snooping of content displayed on the screen by others can be prevented.

It should be noted that as to the above two situations that cause the change of relative positions between the handheld electronic apparatus and the user, corresponding solutions are provided by the present invention, which are respectively described in detail in the following embodiments.

As to the situation that the user maintains stable and the handheld electronic apparatus moves, only the moving distance of the handheld electronic apparatus is acquired, the shifting value of the handheld electronic apparatus deviating from a region where the user is located is calculated, so as to adjust the viewing range of the screen accordingly.

Figure 3:
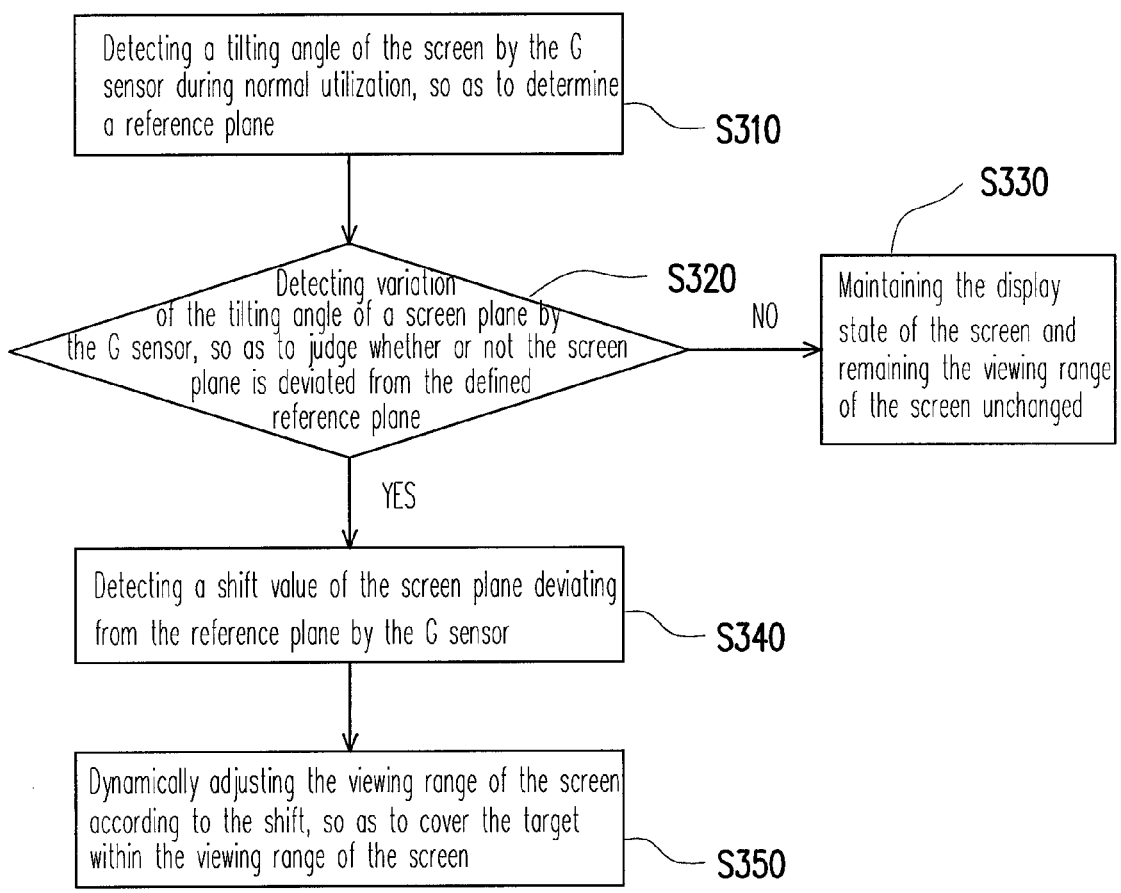
FIG. 3 is a flowchart illustrating a method for dynamically adjusting a viewing angle of a screen according to an embodiment of the present invention.

FIG. 3 is a flowchart illustrating a method for dynamically adjusting a viewing angle of a screen according to an embodiment of the present invention. Referring to FIG. 3, in the present embodiment, a G sensor is applied to detect a movement of a handheld electronic apparatus, so as to adjust a viewing range of a screen of the handheld electronic apparatus. Wherein, the handheld electronic apparatus may be a cell phone, a PDA or a notebook computer, and the viewing angle of the screen is adjustable.

To obtain the moving distance of the handheld electronic apparatus, a reference plane has to be defined first for being used in following judgment. Therefore, when the handheld electronic apparatus is activated, a tilting angle of the screen during normal utilization is detected first by the G sensor, so as to determine the reference plane (step S310). Wherein, since different users have different utilization habits of the handheld electronic apparatus, the placing position or the holding state of the handheld electronic apparatus is varied accordingly. Therefore, in the present embodiment, the tilting angle of the screen during normal utilization is first detected for being used in following judgment.

When the user operates the handheld electronic apparatus, variation of the tilting angle of a present plane of the screen is continually detected by the G sensor of the handheld electronic apparatus, so as to judge whether or not the present plane of the screen is deviated from the defined reference plane (step S320). If yes, a shifting value of the present plane of the screen deviating from the reference plane is further detected (step S340) for being used in following judgment.

Conversely, if not, the display state of the screen is maintained, and the viewing range of the screen is remained unchanged (step S330).

After the shifting value of the present plane of the screen is obtained, the viewing range of the screen is dynamically adjusted by the handheld electronic apparatus according to the shifting value, so as to cover the target (i.e. the user) within the viewing range of the screen (step S350). Wherein, the method for adjusting the viewing range of the screen is the same to that described in the aforementioned embodiment, which is also implemented based on the transformation of the liquid crystal material of the screen, and the detailed description thereof will not be repeated herein.

Figure 4:
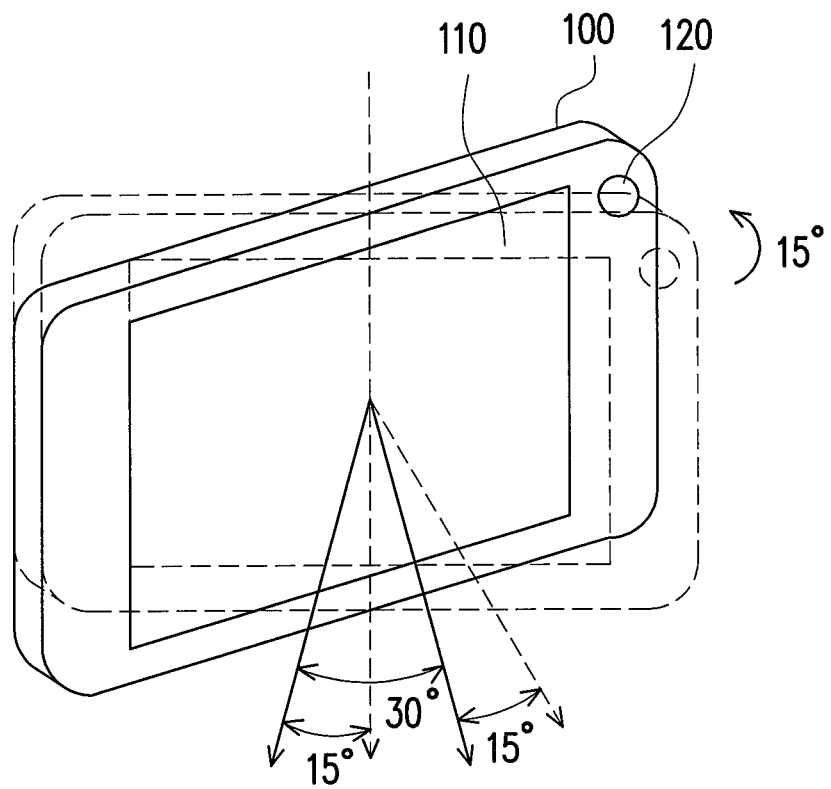
FIG. 4 is a schematic diagram illustrating a method for dynamically adjusting a viewing angle of a screen according to an embodiment of the present invention.

According to the above method, the viewing range of the screen of the handheld electronic apparatus may be adjusted according to the movement thereof at any time, so as to achieve a dynamic adjustment. For example, when the screen plane is judged to be turned rightwards, the viewing range of the screen of the handheld electronic apparatus is then adjusted leftwards, such that the user may still view a frame displayed on the screen. FIG. 4 is a schematic diagram illustrating a method for dynamically adjusting a viewing angle of a screen according to an embodiment of the present invention. In the present embodiment, the adjusting apparatus 100 of FIG. 1 is applied for dynamically adjusting the viewing range of the screen 110. Referring to FIG. 1 first, the viewing range of the screen 110 is within 30 degrees of the viewing angle, during which an eye 130 of the user still remains in front of the screen 110, and therefore the frame displayed on the screen may be viewed by the user. However, in FIG. 4, the screen 110 is turned rightwards, and the viewing range (shown as dot lines) of the screen 110 is turned accordingly, and now a shifting value of the screen 110 detected by the sensor 120 (which is a G sensor in the present embodiment) of the handheld electronic apparatus 100 is 15 degrees, and therefore the viewing range of the screen 110 of the handheld electronic apparatus 100 is then turned left for 15 degrees, such that the eye 130 of the user may still view the frame displayed on the screen 110.

On the other hand, as to the situation that the handheld electronic apparatus maintains stable and the user moves, only the moving distance of the user is acquired, the shifting value of a region where the user is located deviating from the viewing range of the screen is calculated, so as to adjust the viewing range of the screen accordingly.

Figure 5:
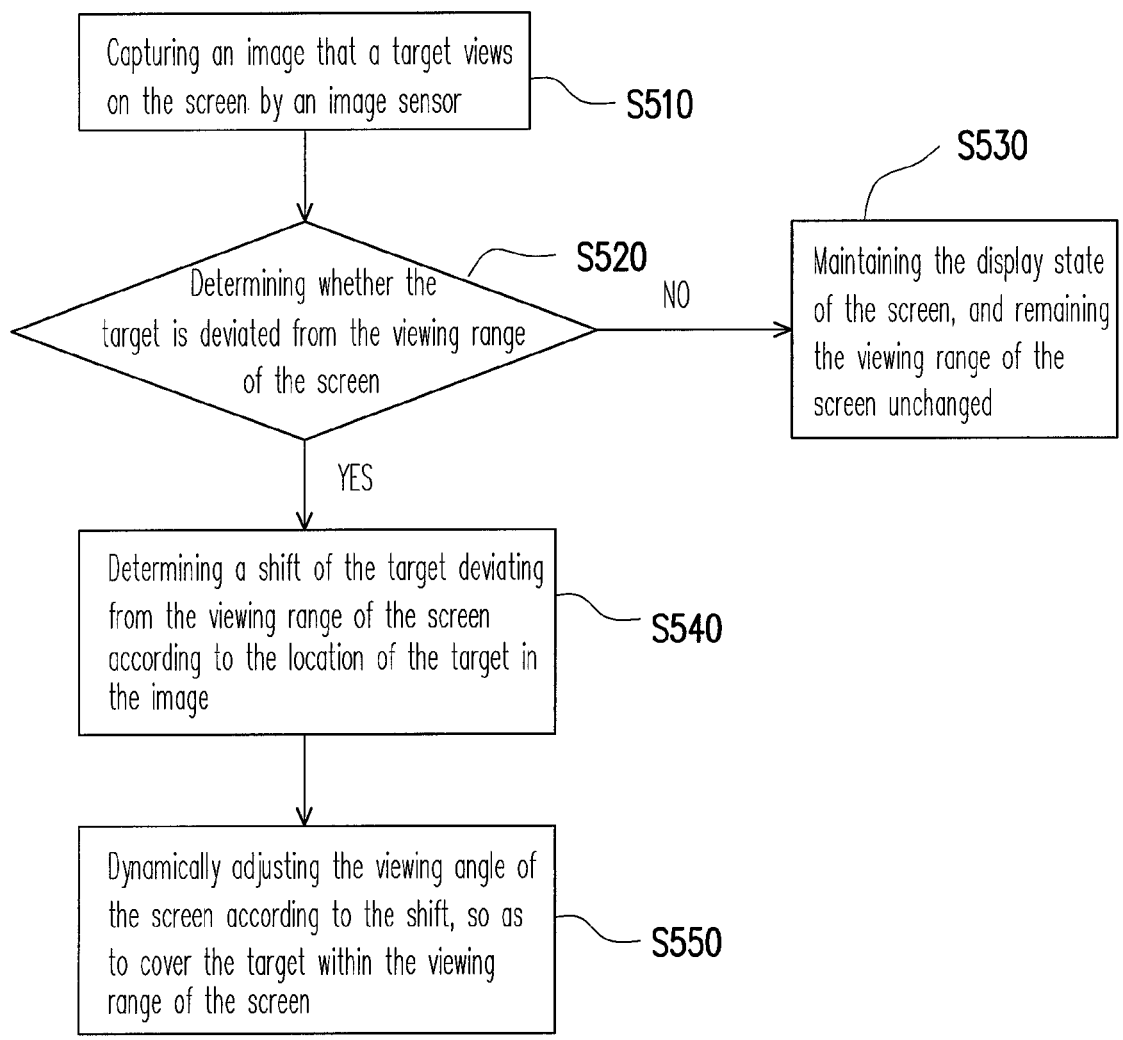
FIG. 5 is a flowchart illustrating a method for dynamically adjusting a viewing angle of a screen according to an embodiment of the present invention.

FIG. 5 is a flowchart illustrating a method for dynamically adjusting a viewing angle of a screen according to another embodiment of the present invention. Referring to FIG. 5, in the present embodiment, an image sensor is applied to detect a movement of a target, so as to adjust a viewing range of a screen of a handheld electronic apparatus. Wherein, the handheld electronic apparatus may be a cell phone, a PDA or a notebook computer, and the viewing angle of the screen is adjustable.

First, an image is captured by the image sensor while the target views the screen (step S510). Wherein, the target may be a face area or an eye area of the user, and the image sensor may be a charge-coupled device (CCD) camera generally equipped to the handheld electronic apparatus, which is used for capturing an image of the user.

In the present embodiment, the image sensor captures an image of the user while the user operates the handheld electronic apparatus, and the location of the target in the image is obtained by an image processing mechanism such as face identification, so as to judge whether or not the target is deviated from the viewing range of the screen (step S520).

Wherein, the handheld electronic apparatus may judge whether or not the target is deviated from the viewing range of the screen by judging whether or not the location of the target in the image is deviated from the centre of the image.

If the target is judged to be deviated from the viewing range of the screen, a shifting value of the target deviating from the viewing range of the screen is then determined by the handheld electronic apparatus according to the location of the target in the image (step S540) for being used in following judgment. Conversely, if the screen plane is judged to be not deviated from the reference plane, the display state of the screen is maintained, and the viewing range of the screen remains unchanged (step S530).

After the shifting value of the screen plane is obtained, the viewing range of the screen is then dynamically adjusted by the handheld electronic apparatus according to the shifting value, so as to cover the target within the viewing range of the screen (step S550). Wherein, the method for adjusting the viewing range of the screen is the same to that described in the aforementioned embodiment, which is also implemented based on the transformation of the liquid crystal material of the screen, and detailed description thereof will not be repeated herein.

Figure 6:
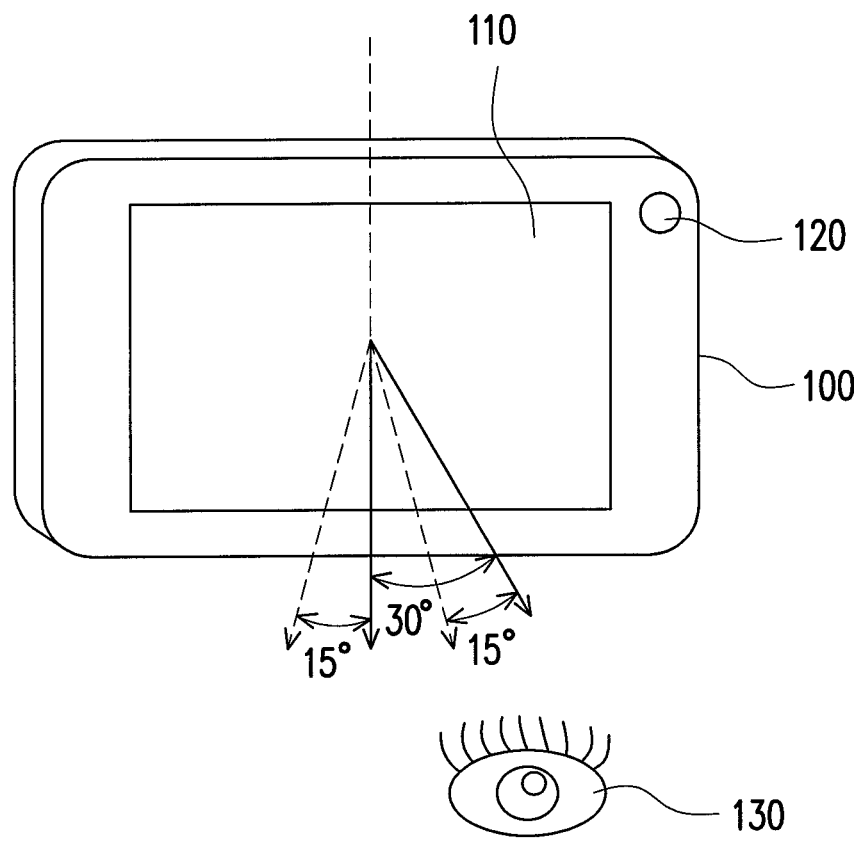
FIG. 6 is a schematic diagram illustrating a method for dynamically adjusting a viewing angle of a screen according to another embodiment of the present invention.

According to the above method, the viewing range of the screen of the handheld electronic apparatus may be adjusted according to the location of the user at any time, so as to achieve a dynamic adjustment. For example, when the user is judged to be moved rightwards, the viewing range of the screen of the handheld electronic apparatus is then adjusted leftwards, such that the user may still view the frame displayed on the screen. FIG. 6 is a schematic diagram illustrating a method for dynamically adjusting a viewing angle of a screen according to another embodiment of the present invention. In the present embodiment, the adjusting apparatus 100 of FIG. 1 is applied for dynamically adjusting the viewing range of the screen 110. Referring to FIG. 1 first, the viewing range of the screen 110 is within 30 degrees of the viewing angle, during which an eye 130 of the user still maintains in front of the screen 110, and therefore the frame displayed on the screen can be viewed by the user. However, in FIG. 6, the eye 130 of the user is moved rightwards, during which by analysing the image captured by the sensor 120 (which is an image sensor in the present embodiment) of the adjusting apparatus 100, it is found that the eye 130 of the user is deviated from the viewing range (shown as dot lines) of the screen 110, and the shifting value thereof is 15 degrees, and therefore the viewing range of the screen 110 of the adjusting apparatus 100 is then turned rightwards for 15 degrees, such that the eye 130 of the user may still view the frame displayed on the screen 110.

According to the aforementioned methods, regardless of the change of the position of the handheld electronic apparatus or the change of viewing direction of the user, by detecting the shifting value via the sensor and adjusting the viewing range of the screen, the user may view the content of frame displayed on the screen all the time, and therefore a manual adjustment is unnecessary.

It should be noted that the adjusting method of the present invention may also be applied to a handheld electronic apparatus which may automatically control a movement of a screen thereof. In detail, a screen position adjuster is applied to the handheld electronic apparatus for adjusting the position and the angle of the screen. According to the aforementioned adjusting method, the handheld electronic apparatus may gradually guide the viewing range of the screen to the target according to the detected shifting value.

Figure 7:
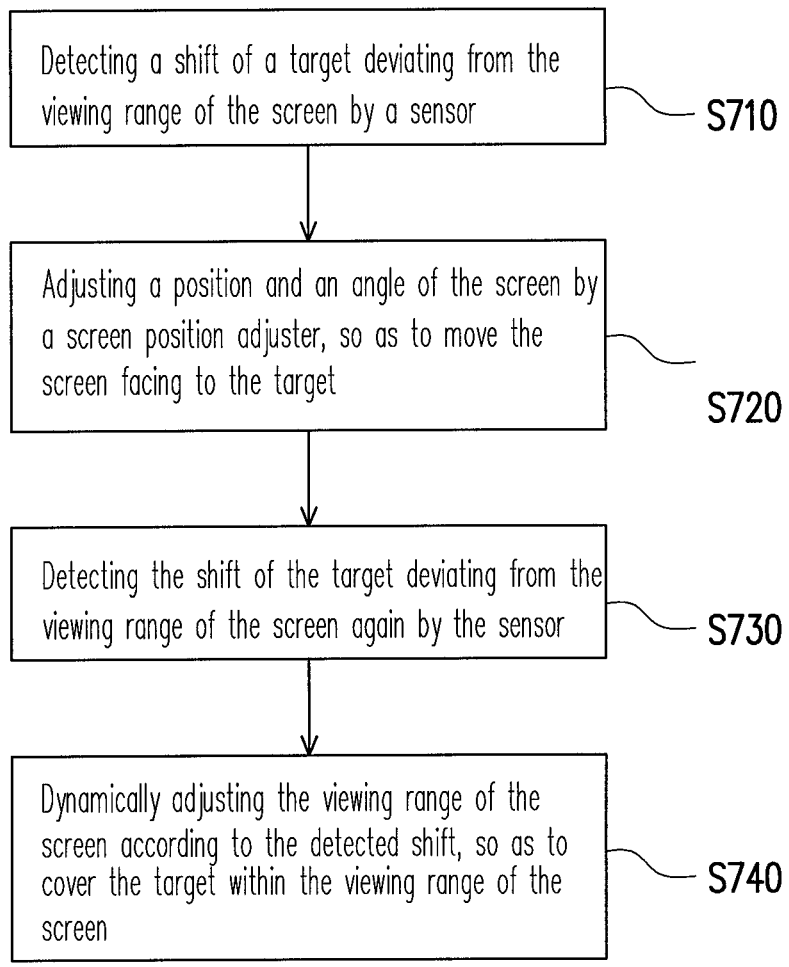
FIG. 7 is a flowchart illustrating a method for dynamically adjusting a viewing angle of a screen according to an embodiment of the present invention.

For example, FIG. 7 is a flowchart illustrating a method for dynamically adjusting a viewing angle of a screen according to an embodiment of the present invention. Referring to FIG. 7, the method of the present embodiment is suitable for adjusting a viewing range of a screen of a handheld electronic apparatus. Wherein, the handheld electronic apparatus may be a cell phone, a PDA or a notebook computer, and the viewing angle of the screen is adjustable. Detailed steps of the method of the present embodiment are described as follows.

First, a shifting value of a target deviating from the viewing range of the screen is detected by a sensor of the handheld electronic apparatus (step S710). Wherein, methods of detecting the shifting value include detecting a shifting value of the handheld electronic apparatus via a G sensor and detecting a shifting value of the target via an image sensor have been already described in detail in the aforementioned embodiments, and therefore detailed description thereof is not repeated.

After the shifting value is obtained, the position and the angle of the screen is then adjusted by the screen position adjuster, so as to guide the screen facing to the target (step S720). Wherein, the screen position adjuster may be a steering device allocated between a host and the screen of the handheld electronic apparatus, and is used for adjusting the position and the angle of the screen, so as to guide the screen facing to a region where the user is located.

After the position and the angle of the screen is adjusted, the shifting value of the target deviating from the viewing range of the screen is again detected by the sensor of the handheld electronic apparatus (step S730), and the viewing range of the screen is then dynamically adjusted according to the detected shifting value, so as to cover the target within the viewing range of the screen (step S740). In brief, by steering the screen via the screen position adjuster, the viewing range of the screen is roughly tuned first, and then the viewing range of the screen is finely tuned based on the feature that the viewing angle of the screen is adjustable, such that the viewing range of the screen may be quickly adjusted.

In summary, the method and the apparatus for dynamically adjusting the viewing angle of the screen apply a G sensor or an image sensor disposed in the handheld electronic apparatus to detect the variation of a relative position between the handheld electronic apparatus and the user, so as to adjust the viewing range of the screen. By such means, not only the snooping of the content displayed on the screen by others is prevented, but also the automatic adjusting mechanism may enable the user to view the content displayed on the screen all the time, and therefore utilization convenience of the handheld electronic apparatus is increased.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for dynamically adjusting a viewing angle of a screen, for dynamically adjusting a viewing range of a screen of a handheld electronic apparatus, wherein the viewing angle of the screen is adjustable, wherein the viewing range of the screen is covered by the viewing angle where the user is able to view a frame displayed on the screen, the method comprising:
   detecting a shifting value of a target deviating from the viewing range of the screen via a sensor, wherein the step of detecting the shifting value of the target deviating from the viewing range of the screen via the sensor comprises:
      detecting a first tilting angle of the screen during normal utilization via a G sensor, so as to determine a reference plane of the screen corresponding to the first tilting angle of the screen during the normal utilization;
      detecting a second tilting angle of a present plane of the screen by the G sensor, so as to determine whether or not the present plane of the screen is deviated from the defined reference plane according to a difference angle between the first tilting angle and the second tilting angle;
   if the present plane of the screen is not deviated from the defined reference plane, maintaining display orientation of the viewing range of the screen unchanged; and
   if the present plane of the screen is deviated from the defined reference plane, detecting the shifting value of the present plane of the screen deviating from the reference plane according to the difference angle between the first tilting angle and the second tilting angle, so as to determine the shifting value of the target deviating from the viewing range of the screen; and
   dynamically adjusting the display orientation of the viewing range of the screen according to the shifting value of the present plane of the screen deviating from the reference plane, wherein the shifting value comprises the difference angle between the defined reference plane and the present plane, so as to cover the target within the viewing range of the screen and prevent a non-target from being covered within the viewing range of the screen,
   wherein the step of detecting the shifting value of the target deviating from the viewing range of the screen via the sensor further comprises:
      capturing an image displayed on the screen while the target views the screen via an image sensor; and
      determining the shifting value of the target deviating from the viewing range of the screen according to a position of the target in the image.

2. The method for dynamically adjusting a viewing angle of a screen as claimed in claim 1, wherein the step of dynamically adjusting the viewing range of the screen according to the shifting value, so as to cover the target within the viewing range of the screen comprises:
   dynamically transforming liquid crystal material of the screen according to the shifting value, so as to shield the light emitted from a backlight source of the screen to an area out of the adjusted viewing range.

3. The method for dynamically adjusting a viewing angle of a screen as claimed in claim 1, wherein after the step of detecting the shifting value of the target deviating from the viewing range of the screen via the sensor, the method further comprises:
   adjusting a position and an angle of the screen via a screen position adjuster which transforms liquid crystal material of the screen of the handheld electronic apparatus according to the shifting value, so as to dynamically re-center the viewing range of the screen;
   detecting a shifting value of the target deviating from the viewing range of the adjusted screen via the sensor again; and
   dynamically re-centering the viewing range of the screen according to the shifting value, so as to cover the target within the viewing range of the screen.

4. An apparatus for dynamically adjusting a viewing angle of a screen, comprising:
- a screen having an adjustable viewing angle;
- a sensor, for detecting a shifting value of a region where a target is located deviating from a viewing range of the screen, wherein a viewing range of the screen is covered by the viewing angle where the user is able to view a frame displayed on the screen and the sensor comprises a G sensor,
- wherein the G sensor detects a first tilting angle of the screen during normal utilization so as to determine a reference plane of the screen corresponding to the first tilting angle of the screen during normal utilization, then the G sensor detects a second tilting angle of a present plane of the screen, so as to determine whether or not a present plane of the screen is deviated from the defined reference plane according to a difference angle between the first tilting angle and the second tilting angle,
- wherein if the present plane of the screen is deviated from the defined reference plane, the G sensor detects the shifting value of the present plane of the screen deviating from the reference plane according to the difference angle between the first tilting angle and the second tilting angle, so as to determine the shifting value of the target deviating from the viewing range of the screen; and
- a control unit, for dynamically adjusting display orientation of the viewing range of the screen according to the shifting value of the present plane of the screen deviating from the reference plane, wherein the shifting value comprises the difference angle between the defined reference plane and the present plane, so as to cover the target within the viewing range of the screen and prevent a non-target from being covered within the viewing range of the screen,
- wherein if the present plane of the screen is not deviated from the defined reference plane, the control unit maintains the display orientation of the viewing range of the screen unchanged,
- wherein the sensor further comprises an image sensor for capturing an image displayed on the screen while the target views the screen, and the shifting value of the target deviating from the viewing range of the screen is determined according to a position of the target in the image.

5. The apparatus for dynamically adjusting a viewing angle of a screen as claimed in claim 4, wherein material of the screen comprises liquid crystal material for being transformed according to the shift value, so as to shield the light emitted from a backlight source of the screen to an area out of the adjusted viewing range.

6. The apparatus for dynamically adjusting a viewing angle of a screen as claimed in claim 4, further comprising:
- a screen position adjuster which transforms liquid crystal material of the screen of the handheld electronic apparatus according to the shifting value, for dynamically re-centering the viewing range of the screen according to the shifting value, so as to cover the region where the target is located within the viewing range of the screen.

* * * * *